(12) United States Patent
Mino

(10) Patent No.: US 12,224,671 B2
(45) Date of Patent: Feb. 11, 2025

(54) POWER SUPPLY CIRCUIT WITH TWO POWER CONVERSION CIRCUITS

(71) Applicant: Murata Manufacturing Co., Ltd., Kyoto (JP)

(72) Inventor: Kazuaki Mino, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 203 days.

(21) Appl. No.: 18/069,527

(22) Filed: Dec. 21, 2022

(65) Prior Publication Data

US 2023/0124775 A1 Apr. 20, 2023

Related U.S. Application Data

(63) Continuation of application No. PCT/JP2021/024307, filed on Jun. 28, 2021.

(30) Foreign Application Priority Data

Jul. 3, 2020 (JP) ................................. 2020-115408

(51) Int. Cl.
*H02M 3/335* (2006.01)
*H02M 1/00* (2006.01)
(Continued)

(52) U.S. Cl.
CPC ....... *H02M 3/33569* (2013.01); *H02M 1/007* (2021.05); *H02M 1/008* (2021.05);
(Continued)

(58) Field of Classification Search
CPC ........ H02M 1/007; H02M 1/008; H02M 1/32; H02M 3/33569; H02M 3/33573; H02M 3/33576; H02M 3/33507
See application file for complete search history.

(56) References Cited

U.S. PATENT DOCUMENTS

| 6,385,058 B1* | 5/2002 | O'Meara | H02M 3/33561 363/21.01 |
| 2016/0149501 A1* | 5/2016 | Dai | H02M 3/33573 363/21.02 |

(Continued)

FOREIGN PATENT DOCUMENTS

| EP | 3533669 A1 | 9/2019 |
| JP | H09-065509 A | 3/1997 |

(Continued)

OTHER PUBLICATIONS

International Search Report for PCT/JP2021/024307 dated Sep. 7, 2021.

*Primary Examiner* — Adolf D Berhane
*Assistant Examiner* — Jye-June Lee
(74) *Attorney, Agent, or Firm* — McDonald Hopkins LLC

(57) ABSTRACT

A power supply circuit includes a transformer having a primary winding and secondary windings, a first power conversion circuit configured to convert a DC voltage into an AC voltage and output the AC voltage to the primary winding, a rectifying and smoothing circuit that is connected to the secondary winding and is configured to rectify and smooth an alternating current output from the secondary winding, and a second power conversion circuit configured to boost a direct current output from the rectifying and smoothing circuit and supply to a load a DC voltage lower than a rated voltage of the load set in advance.

20 Claims, 7 Drawing Sheets

(51) Int. Cl.
  *H02M 1/08* (2006.01)
  *H02M 1/32* (2007.01)
  *H02M 1/42* (2007.01)
  *H02M 7/217* (2006.01)
  *H02M 7/537* (2006.01)

(52) U.S. Cl.
  CPC ............... *H02M 1/08* (2013.01); *H02M 1/32* (2013.01); *H02M 1/4283* (2021.05); *H02M 3/33507* (2013.01); *H02M 7/217* (2013.01); *H02M 7/537* (2013.01); *H02M 1/0009* (2021.05)

(56) References Cited

U.S. PATENT DOCUMENTS

2017/0110972 A1* 4/2017 Handa ............... H02M 3/33507
2017/0117731 A1   4/2017 Shimada et al.
2020/0412237 A1* 12/2020 Dai ..................... H02M 3/155

FOREIGN PATENT DOCUMENTS

| | | |
|---|---|---|
| JP | 2014-036528 A | 2/2014 |
| JP | 2015-208171 A | 11/2015 |
| JP | 2018-125985 A | 8/2018 |
| JP | 2020-507293 A | 3/2020 |
| WO | 2018/139200 A1 | 8/2018 |

* cited by examiner

POWER SUPPLY CIRCUIT WITH TWO POWER CONVERSION CIRCUITS

CROSS REFERENCE TO RELATED APPLICATION

This is a continuation of International Application No. PCT/JP2021/024307 filed on Jun. 28, 2021 which claims priority from Japanese Patent Application No. 2020-115408 filed on Jul. 3, 2020. The contents of these applications are incorporated herein by reference in their entireties.

BACKGROUND ART

Technical Field

The present disclosure relates to a power supply circuit.

A dual-output port charging circuit is proposed which includes a transformer, a primary-side conversion circuit that is connected to the primary side of the transformer and is configured to supply an alternating current to the primary-side winding of the transformer, and a first secondary-side conversion circuit and a second secondary-side conversion circuit that are connected to the secondary side of the transformer and are configured to receive an alternating current supplied from the secondary-side winding of the transformer (see, for example, Patent Document 1). The second secondary-side conversion circuit includes a rectifier circuit configured to rectify an AC voltage supplied from the transformer and a step-down chopper circuit that includes a switching element and is configured to step down a voltage output from the rectifier circuit and output the voltage to a load.

Patent Document 1: Japanese Unexamined Patent Application Publication (Translation of PCT Application) No. 2020-507293

BRIEF SUMMARY

In the dual-output port charging circuit described in Patent Document 1, the step-down chopper circuit of the second secondary-side conversion circuit sometimes steps down a voltage higher than the rated voltage of the load to a voltage lower than or equal to the rated voltage of the load and outputs the voltage to the load. In the case where the switching element forming a part of the step-down chopper circuit is subjected to a short-circuit fault, a voltage exceeding the rated voltage may be applied to the load or a power supply, such as a battery, connected to the step-down chopper circuit. This leads to the breakage of the load.

The present disclosure has been made in view of the above reasons, and it is an object of the present disclosure to provide a power supply circuit with which the occurrence of breakage of a load can be suppressed.

To achieve the above-described object, a power supply circuit according to the present disclosure includes a transformer having a primary winding and a secondary winding, a first power conversion circuit configured to convert a DC voltage into an AC voltage and output the AC voltage to the primary winding, a rectifying and smoothing circuit configured to rectify and smooth an AC voltage output from the secondary winding, and a second power conversion circuit configured to boost a DC voltage output from the rectifying and smoothing circuit and supply to a first load a DC voltage lower than a rated voltage of the first load set in advance.

The power supply circuit according to the present disclosure may further include an input voltage determination unit configured to determine whether an input voltage of the second power conversion circuit falls within a first reference voltage range set in advance, and a first power conversion circuit control unit configured to control the first power conversion circuit.

The first power conversion circuit control unit may control the first power conversion circuit to reduce an output voltage of the second power conversion circuit when the input voltage determination unit determines that the input voltage of the second power conversion circuit is greater than or equal to an upper limit of the first reference voltage range, and stop the first power conversion circuit when the input voltage determination unit determines that the input voltage of the second power conversion circuit is greater than or equal to the upper limit of the first reference voltage range after the control of the first power conversion circuit.

The power supply circuit according to the present disclosure may further include an input voltage determination unit configured to determine whether an input voltage of the second power conversion circuit falls within a first reference voltage range set in advance, and a second power conversion circuit control unit configured to control the second power conversion circuit.

The second power conversion circuit control unit may stop the second power conversion circuit when the input voltage determination unit determines that the input voltage of the second power conversion circuit is greater than or equal to an upper limit of the first reference voltage range.

The power supply circuit according to the present disclosure may further include an output voltage determination unit configured to determine whether an output voltage of the second power conversion circuit falls within a second reference voltage range set in advance, and a second power conversion circuit control unit configured to control the second power conversion circuit.

The second power conversion circuit may include a second inductor, one end of which is connected to a high-potential-side output terminal of the rectifying and smoothing circuit, and a second switching element connected between another end of the second inductor and a low-potential-side output terminal of the rectifying and smoothing circuit.

The second power conversion circuit control unit may control an ON/OFF operation of the second switching element to reduce the output voltage of the second power conversion circuit when the input voltage determination unit determines that the input voltage of the second power conversion circuit falls within the first reference voltage range set in advance and the output voltage determination unit determines that the output voltage of the second power conversion circuit is greater than or equal to an upper limit of the second reference voltage range.

The power supply circuit according to the present disclosure may further include a current determination unit configured to determine whether a current flowing through the second switching element is greater than or equal to a current threshold value set in advance.

The second power conversion circuit control unit may maintain the second switching element in an OFF state when the current determination unit determines that a current value of a current flowing through the second switching element is greater than or equal to the current threshold value.

In the power supply circuit according to the present disclosure, the second power conversion circuit control unit may restart an ON/OFF operation of the second switching element when the current determination unit determines that a current value of a current flowing through the second switching element in an ON state is less than the current threshold value after an elapse of a reference time period set in advance from a time at which the second switching element has been brought into the OFF state.

The power supply circuit according to the present disclosure may further include a current determination unit configured to determine whether a current flowing through the second switching element is greater than or equal to a current threshold value set in advance.

The second power conversion circuit control unit may reduce a duty ratio of the second switching element when the current determination unit determines that a current value of a current flowing through the second switching element is greater than or equal to the current threshold value.

According to the present disclosure, the second power conversion circuit boosts a DC voltage output from the rectifying and smoothing circuit and supplies to a first load a DC voltage lower than a rated voltage of the first load set in advance. Since a voltage lower than the rated voltage of the first load can be output to the first load when the second power conversion circuit fails and loses the boosting function thereof, the breakage of the first load due to the application of a voltage exceeding the rated voltage of the first load to the first load can be suppressed.

DETAILED DESCRIPTION

Embodiments of the present disclosure will be described in detail below with reference to the drawings. A power supply circuit according to the present embodiment includes a transformer including a primary winding and two secondary windings, a first power conversion circuit configured to convert a DC voltage into an AC voltage and output the AC voltage to the primary winding of the transformer, a rectifying and smoothing circuit that is connected to a first secondary winding, which is one of the two secondary windings, and that is configured to rectify and smooth an AC voltage output from the first secondary winding, and a second power conversion circuit configured to boost a direct current output from the rectifying and smoothing circuit to supply a DC voltage lower than or equal to a rated voltage of a first load set in advance to the first load.

Figure 1:
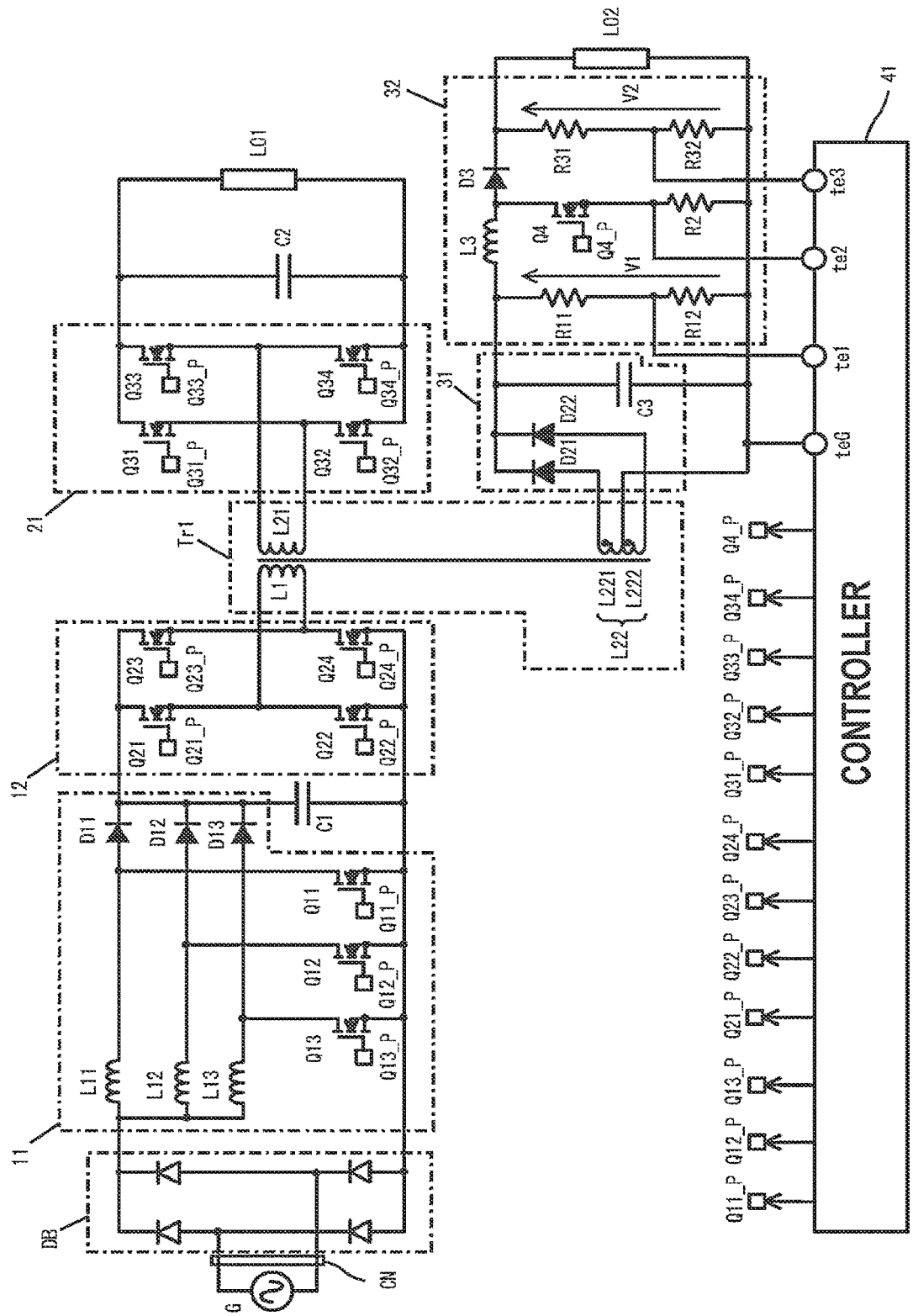
FIG. 1 is a circuit diagram of a power supply circuit according to an embodiment of the present disclosure.

For example, a power supply circuit according to the present embodiment is connected to an external AC system G via a connector CN when an EV or a PHEV stops, converts AC power supplied from the AC system G via the connector CN into DC power, and supplies the DC power to a load LO1 and a load LO2 as illustrated in FIG. 1. The load LO1 has, for example, the output voltage of approximately 200 to 450 V and is a second load formed of a so-called high-voltage battery functioning as a DC power supply for driving a motor installed in a vehicle. The load LO2 has, for example, the output voltage of approximately 14 V and is a first load formed of a so-called low-voltage battery functioning as a DC power supply for driving vehicle accessories installed in a vehicle, such as a wiper, headlights, room lights, an audio device, an air conditioner, and various instruments.

A power supply circuit includes a transformer Tr1 including a primary winding L1 and two secondary windings L21 and L22, a diode bridge DB, a power factor correction circuit (hereinafter referred to as a PFC circuit) 11, smoothing capacitors C1 and C2, and power conversion circuits 12 and 21. The power supply circuit further includes a rectifying and smoothing circuit 31, a power conversion circuit 32, and a controller 41. The diode bridge DB is a rectifier circuit that is connected to the AC system G and is configured to rectify an alternating current supplied from the AC system G. The PFC circuit 11 improves the power factor of an alternating current supplied from the AC system G. The PFC circuit 11 includes three inductors L11, L12, and L13, three switching elements Q11, Q12, and Q13, and three diodes D11, D12, and D13. Each of the inductors L11, L12, and L13 is a first inductor, one end of which is connected to the high-potential-side output terminal of the diode bridge DB. The switching elements Q11, Q12, and Q13 are first switching elements connected between the other ends of the inductors L11, L12, and L13 and the low-potential-side output terminal of the diode bridge DB, respectively. The switching elements Q11, Q12, and Q13 are, for example, n-channel MOSFETs. The respective sources of the switching elements Q11, Q12, and Q13 are connected to the low-potential-side output terminal of the diode bridge DB, and the drains of the switching elements Q11, Q12, and Q13 are connected to the first inductors L11, L12, and L13, respectively. The anodes of the diodes D11, D12, and D13 are connected to the other ends of the inductors L11, L12, and L13 and the drains of the switching elements Q11, Q12, and Q13, respectively.

The capacitor C1 is connected between the respective cathodes of the diodes D11, D12, and D13 and the low-potential-side output terminal of the diode bridge DB.

The power conversion circuit 12 is a full-bridge first power conversion circuit including four switching elements Q21, Q22, Q23, and Q24 and functions as a DC-AC converter for converting a direct current into an alternating current. The power conversion circuit 12 is connected between both ends of the switching element Q11 via the diode D11, between both ends of the switching element Q12 via the diode D12, and between both ends of the switching element Q13 via the diode D13. Each of the switching elements Q21 and Q23 is, for example, an n-channel MOSFET and has a drain connected to the respective cathodes of the diodes D11, D12, and D13. The switching elements Q22 and Q24 are, for example, n-channel MOSFETs and have drains connected to the sources of the switching elements Q21 and Q23, respectively and respective sources connected to the low-potential-side output terminal of the diode bridge DB. One end of the primary winding L1 of the transformer Tr1 is connected between the switching elements Q21 and Q22, and the other end of the primary winding L1 is connected between the switching elements Q23 and Q24.

The transformer Tr1 includes the primary winding L1 provided on the AC system G side and the two secondary windings L21 and L22. The secondary winding L21 is a second secondary winding provided on the load LO1 side. The secondary winding L22 is a first secondary winding that is provided on the load LO2 side and includes a pair of sub-windings L221 and L222. The winding ratio between the number of windings of the primary winding L1 and the number of windings of the secondary winding L21 is set in accordance with a voltage needed for the load LO1. The winding ratio between the number of windings of the primary winding L1 and the number of windings of the secondary winding L22, that is, the number of windings of the sub-windings L221 and L222, is set in accordance with the output voltage of the power conversion circuit 12 and the rated voltage of the load LO2.

The power conversion circuit 21 is a full-bridge third power conversion circuit including four switching elements Q31, Q32, Q33, and Q34 and functions as an AC-DC converter for converting an alternating current into a direct current. That is, the power conversion circuit 21 converts an alternating current output from the secondary winding L21, which is different from the secondary winding L22, into a direct current and outputs the direct current to the load LO1, which is different from the load LO2. Each of the switching elements Q31 and Q33 is, for example, an n-channel MOSFET and has a drain connected to one end of the secondary winding L21 of the transformer Tr1. The switching elements Q32 and Q34 are, for example, n-channel MOSFETs and have drains connected to the sources of the switching elements Q31 and Q33, respectively and respective sources connected to the other end of the secondary winding L22 of the transformer Tr1. One end of the smoothing capacitor C2 is connected between the switching elements Q31 and Q32, and the other end of the capacitor C2 is connected between the switching elements Q33 and Q34. The load LO1 is connected between both ends of the smoothing capacitor C2.

The rectifying and smoothing circuit 31 includes two diodes D21 and D22 and a smoothing capacitor C3 and rectifies and smooths an alternating current output from the secondary winding L22 of the transformer Tr1. The anode of the diode D21 is connected to one end of the sub-winding L221 of the secondary winding L22, and the anode of the diode D22 is connected to one end of the sub-winding L222. One end of the capacitor C3 is connected to the cathodes of the diodes D21 and D22, and the other end of the capacitor C3 is connected to the other ends of the sub-windings L221 and L222 of the transformer Tr1.

The power conversion circuit 32 boosts a direct current output from the rectifying and smoothing circuit 31 and outputs the boosted direct current to the load LO2. The power conversion circuit 32 outputs to the load LO2 a DC voltage lower than or equal to the rated voltage of the load LO2 set in advance. The power conversion circuit 32 includes an inductor L3, a switching element Q4, and a diode D3. The inductor L3 is a second inductor, one end of which is connected to the high-potential-side output terminal of the rectifying and smoothing circuit 31, that is, the cathodes of the diodes D21 and D22. The switching element Q4 is a second switching element connected between the other end of the inductor L3 and the low-potential-side output terminal of the rectifying and smoothing circuit 31. The switching element Q4 is, for example, an n-channel MOSFET and has a drain connected to the other end of the inductor L3 and a source connected to the load LO2 and the low-potential-side output terminal of the rectifying and smoothing circuit 31 via a resistor R2. The diode D3 has an anode connected to the other end of the inductor L3 and the drain of the switching element Q4 and a cathode connected to the load LO2. The power conversion circuit 32 further includes two resistors R11 and R12 connected between the output terminals of the rectifying and smoothing circuit 31 and two resistors R31 and R32 connected in series between the cathode of the diode D3 and the low-potential-side output terminal of the rectifying and smoothing circuit 31. The resistors R11 and R12 and the resistors R31 and R32 are selected such that the maximum voltage values of voltages across the resistors R12 and R32 become, for example, approximately 3 V.

The controller 41 includes a gate driving circuit (not illustrated) and has terminals Q11_P, Q12_P, Q13_P, Q21_P, Q22_P, Q23_P, Q24_P, Q31_P, Q32_P, Q33_P, Q34_P, Q4_P, te1, te2, te3, and teG. The terminals Q11_P, Q12_P, and Q13_P are connected to the gates of the switching elements Q11, Q12, and Q13, respectively in the PFC circuit 11 via the gate driving circuit. The terminals Q21_P, Q22_P, Q23_P, and Q24_P are connected to the gates of the switching elements Q21, Q22, Q23, and Q24, respectively in the power conversion circuit 12. The terminals Q31_P, Q32_P, Q33_P, and Q34_P are connected to the gates of the switching elements Q31, Q32, Q33, and Q34, respectively in the power conversion circuit 21. The Q4_P is connected to the gate of the switching element Q4 in the power conversion circuit 32. The terminal teG is connected to the low-potential-side output terminal of the rectifying and smoothing circuit 31. The terminal te1 is connected between the two resistors R11 and R12. The terminal te2 is connected between the switching element Q4 and the resistor R2. The terminal te3 is connected between the two resistors R31 and R32. A voltage obtained by dividing the output voltage (a voltage value V1) of the rectifying and smoothing circuit 31 by the resistors R11 and R12 is applied between the terminals teG and te1. A voltage proportional to a current flowing through the resistor R2 is applied between the terminals teG and te2. A voltage obtained by dividing a voltage (a voltage value V2) generated between the cathode of the diode D3 and the low-potential-side output terminal of the rectifying and smoothing circuit 31 by the resistors R31 and R32 is applied between the terminals teG and te3.

Figure 2:
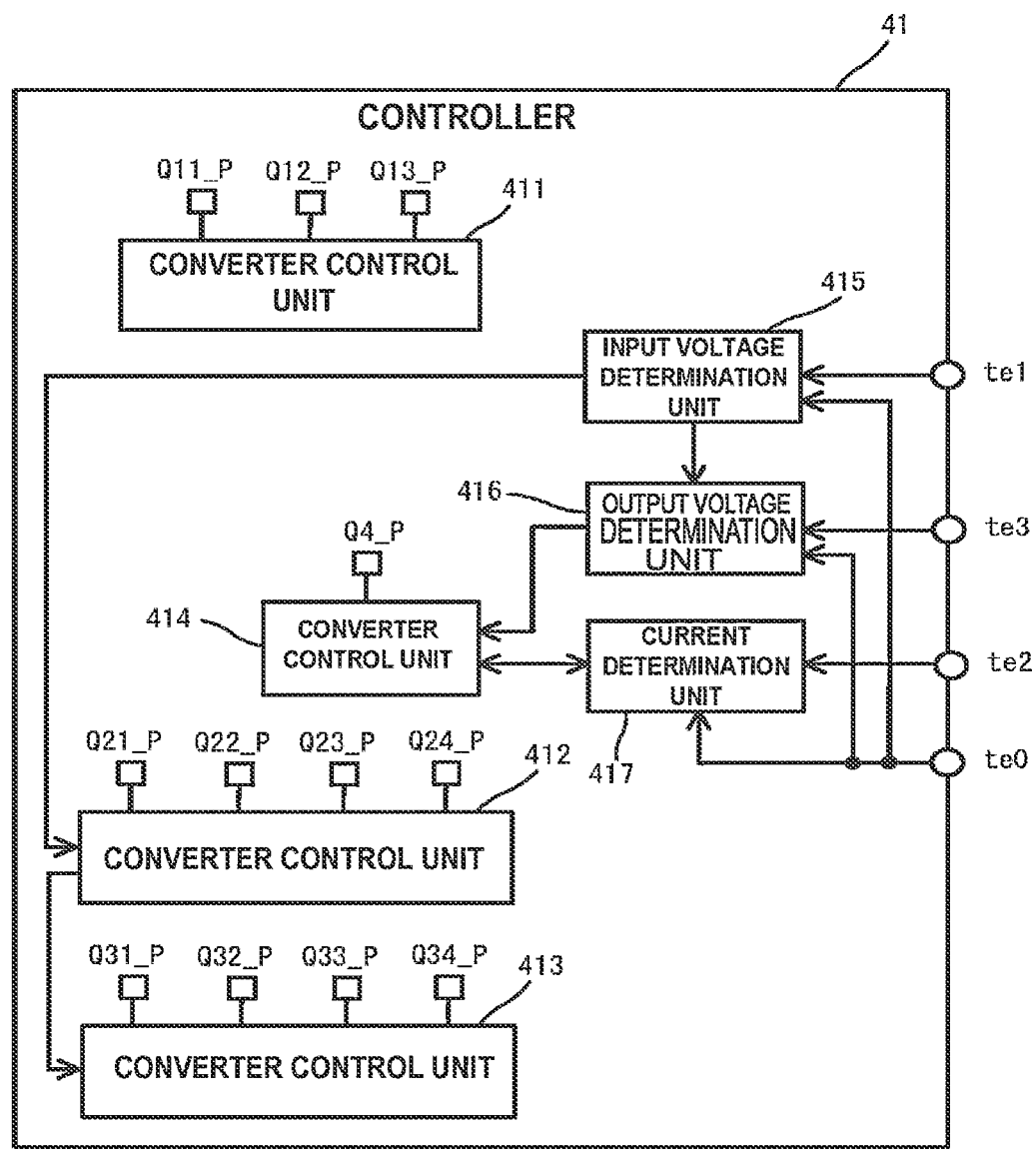
FIG. 2 is a block diagram of a controller according to an embodiment.

The controller 41 include, for example, an FPGA (field-programmable gate array) and includes converter control units 411, 412, 413, and 414, an input voltage determination unit 415, an output voltage determination unit 416, and a current determination unit 417 as illustrated in FIG. 2. The converter control unit 411 outputs a PWM (pulse width modulation) signal from the terminals Q11_P, Q12_P, and Q13_P to the gates of the switching elements Q11, Q12, and Q13, respectively via the gate driving circuit to control the output voltage of the PFC circuit 11.

The converter control unit 412 is a first power conversion circuit control unit that outputs a PWM signal from the terminals Q21_P, Q22_P, Q23_P, and Q24_P to the gates of the switching elements Q21, Q22, Q23, and Q24, respectively to drive the power conversion circuit 12. The converter control unit 412 causes the switching elements Q21, Q22, Q23, Q24 to perform an ON/OFF operation such that a first state in which the switching elements Q21 and Q24 are turned on and the switching elements Q22 and Q23 are turned off and a second state in which the switching elements Q21 an Q24 are turned off and the switching elements Q22 and Q23 are turned on are alternately repeated. The converter control unit 412 outputs to the converter control unit 413 a synchronization signal that is in synchronization with the repetition of the first state and the second state of the switching elements Q21, Q22, Q23, and Q24. The converter control unit 412 controls the ON/OFF operations of the switching elements Q21, Q22, Q23, and Q24 such that the output voltage value of the power conversion circuit 12 becomes an output voltage instruction value represented by output voltage instruction information input from the input voltage determination unit 415. For example, the converter control unit 412 adjusts the on duty ratios of the ON/OFF operations of the switching elements Q21, Q22, Q23, and Q24 such that the output voltage value of the power conversion circuit 12 becomes the above-described output voltage instruction value.

The converter control unit 413 outputs a PWM signal from the terminals Q31_P, Q32_P, Q33_P, and Q34_P to the gates of the switching elements Q31, Q32, Q33, and Q34, respectively to drive the power conversion circuit 21. The converter control unit 413 causes the switching elements Q31, Q32, Q33, and Q34 to perform the ON/OFF operation such that a third state in which the switching elements Q31 and Q34 are turned on and the switching elements Q32 and Q33 are turned off and a fourth state in which the switching elements Q31 an Q34 are turned off and the switching elements Q32 and Q33 are turned on are alternately repeated. The converter control unit 413 causes the switching elements Q31, Q32, Q33, and Q34 to perform the ON/OFF operation in synchronization with the ON/OFF operations of the switching elements Q21, Q22, Q23, and Q24 in the power conversion circuit 12 in response to a synchronization signal input from the converter control unit 412.

The converter control unit 414 is a second power conversion circuit control unit that outputs a control signal from the terminal Q4_P to the gate of the switching element Q4 to drive the power conversion circuit 32. The converter control unit 414 controls the on duty ratio of the ON/OFF operation of the switching element Q4 such that the output voltage value of the power conversion circuit 32 becomes an output voltage instruction value represented by output voltage instruction information input from the output voltage determination unit 416. When an OFF instruction signal for instructing that the switching element Q4 is maintained in the OFF state is input from the current determination unit 417, the converter control unit 414 maintains the switching element Q4 in the OFF state for a reference time period set in advance from the input of the OFF instruction signal. The converter control unit 414 also outputs a control signal to the current determination unit 417.

The input voltage determination unit 415 determines whether the input voltage of the power conversion circuit 32 falls within a first reference voltage range set in advance on the basis of a voltage generated between the terminals teG and te1. The first reference voltage range is set to a voltage range lower than the rated voltage of the load LO2 and is set to, for example, the range of 5 V to a voltage less than 10 V. When determining that the input voltage of the power conversion circuit 32 is greater than or equal to the upper limit of the first reference voltage range, the input voltage determination unit 415 updates the output voltage instruction value represented by the output voltage instruction information, which is to be output to the converter control unit 412, to an output voltage instruction value lower than the output voltage instruction value by a unit voltage set in advance. Accordingly, the converter control unit 412 controls the ON/OFF operations of the switching elements Q21, Q22, Q23, and Q24 in the power conversion circuit 12 to reduce the output voltage of the power conversion circuit 12 by the unit voltage. On the other hand, when determining that the input voltage of the power conversion circuit 32 is lower than the lower limit of the first reference voltage range, the input voltage determination unit 415 updates the output voltage instruction value represented by the output voltage instruction information, which is to be output to the converter control unit 412, to an output voltage instruction value higher than the output voltage instruction value by a unit voltage set in advance. Accordingly, the converter control unit 412 controls the ON/OFF operations of the switching elements Q21, Q22, Q23, and Q24 in the power conversion circuit 12 to increase the output voltage of the power conversion circuit 12 by the unit voltage. When the input voltage of the power conversion circuit 32 falls within the first reference voltage range, the input voltage determination unit 415 outputs a notification signal notifying that the input voltage of the power conversion circuit 32 falls within the first reference voltage range to the output voltage determination unit 416.

The output voltage determination unit 416 determines whether the output voltage of the power conversion circuit 32 falls within a second reference voltage range set in advance on the basis of a voltage generated between the terminals teG and te3. The second reference voltage range is set on the basis of the rated voltage of the load LO2 and is set to, for example, the range of 12 V to a voltage less than 15 V. When determining that the output voltage of the power conversion circuit 32 is greater than or equal to the upper limit of the second reference voltage range in the case where the input voltage of the power conversion circuit 32 falls within the first reference voltage range, the output voltage determination unit 416 updates the output voltage instruction value represented by the output voltage instruction information, which is to be output to the converter control unit 414, to an output voltage instruction value lower than the output voltage instruction value by a unit voltage set in advance. Accordingly, the converter control unit 414 reduces the duty ratio of the ON/OFF operation of the switching element Q4 in the power conversion circuit 32 to reduce the output voltage of the power conversion circuit 32 by the unit voltage. On the other hand, when determining that the output voltage of the power conversion circuit 32 is less than the lower limit of the second reference voltage range in the case where the input voltage of the power conversion circuit 32 falls within the first reference voltage range, the output voltage determination unit 416 updates the output voltage instruction value represented by the output voltage instruction information, which is to be output to the converter control unit 414, to an output voltage instruction value higher than the output voltage instruction value by a unit voltage set in advance. Accordingly, the converter control unit 414 increases the duty ratio of the ON/OFF operation of the switching element Q4 in the power conversion circuit 32 to reduce the output voltage of the power conversion circuit 32 by the unit voltage.

The current determination unit 417 determines whether a current flowing through the switching element Q4 in the power conversion circuit 32 is greater than or equal to a current threshold value set in advance on the basis of a voltage generated between the terminals teG and te2. When the voltage generated between the terminals teG and te2 is higher than a voltage corresponding to the product of the current threshold value set in advance and the resistance value of the resistor R2, the current determination unit 417 determines that the current flowing through the switching element Q4 is greater than the current threshold value. The current determination unit 417 detects the ON state of the switching element Q4 on the basis of a control signal input from the converter control unit 414 and detects the current flowing through the switching element Q4 when the switching element Q4 is in the ON state. When determining that the current value of the current flowing through the switching element Q4 is greater than or equal to the current threshold value, the current determination unit 417 outputs to the converter control unit 414 a duty ratio reduction instruction signal for instructing that the duty ratio of the ON/OFF operation of the switching element Q4 is reduced by a rate set in advance or an OFF instruction signal for instructing that the switching element Q4 is maintained in the OFF state. When the duty ratio reduction instruction signal is input to the converter control unit 414, the converter control unit 414 reduces the duty ratio of the ON/OFF operation of the switching element Q4 by the rate set in advance. When the OFF instruction signal is input to the converter control unit 414, the converter control unit 414 maintains the switching element Q4 in the OFF state for the above-described reference time period.

Figure 3:
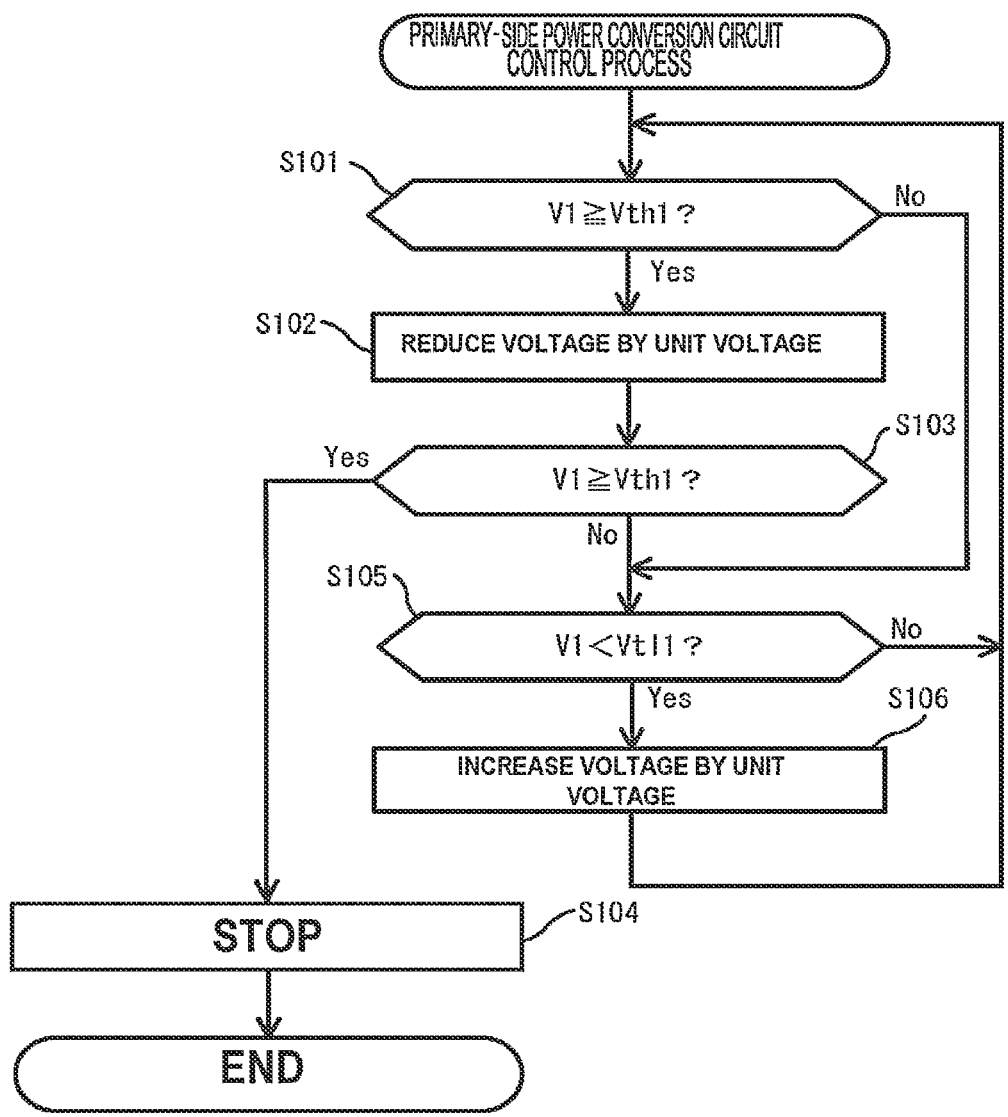
FIG. 3 is a flowchart illustrating an exemplary process of controlling a primary-side power conversion circuit which is performed by a controller according to an embodiment.

Next, a primary-side voltage conversion circuit control process performed by the controller 41 according to the present embodiment will be described with reference to FIG. 3. The primary-side voltage conversion circuit control process starts when the power supply circuit starts an operation. The input voltage determination unit 415 determines whether the voltage value V1 of the input voltage of the power conversion circuit 32 is greater than or equal to an upper limit Vth1 of the first reference voltage range set in advance (step S101). When the input voltage determination unit 415 determines that voltage value V1 of the input voltage of the power conversion circuit 32 is less than the upper limit Vth1 of the first reference voltage range (step S101: No), the processing of step S105 to be described below is performed. On the other hand, when determining that the voltage value V1 of the input voltage of the power conversion circuit 32 is greater than or equal to the upper limit Vth1 of the first reference voltage range (step S101: Yes), the input voltage determination unit 415 updates the output voltage instruction value represented by the output voltage instruction information, which is to be output to the converter control unit 412 to an output voltage instruction value less than the output voltage instruction value by the above-described unit voltage. Accordingly, the converter control unit 412 controls the ON/OFF operations of the switching elements Q21, Q22, Q23, and Q24 in the power conversion circuit 12 to reduce the output voltage of the power conversion circuit 12 by the unit voltage (step S102).

Subsequently, the input voltage determination unit 415 determines whether the voltage value V1 of the input voltage of the power conversion circuit 32 is greater than or equal to the upper limit Vth1 of the first reference voltage range again (step S103). When determining that the voltage value V1 of the input voltage of the power conversion circuit 32 is greater than or equal to the upper limit Vth1 of the first reference voltage range (step S103: Yes), the input voltage determination unit 415 outputs an OFF instruction signal for stopping the power conversion circuit 12 to the converter control unit 412. Accordingly, the converter control unit 412 stops the power conversion circuit 12 by maintaining the switching elements Q21, Q22, Q23, and Q24 in the power conversion circuit 12 in the ON state (step S104).

On the other hand, when determining that the voltage value V1 of the input voltage of the power conversion circuit 32 is less than the upper limit Vth1 of the first reference voltage range (step S103: No), the input voltage determination unit 415 determines whether the voltage value V1 of the input voltage of the power conversion circuit 32 is less than a lower limit Vtl1 of the first reference voltage range set in advance (step S105). When the input voltage determination unit 415 determines that the voltage value V1 of the input voltage of the power conversion circuit 32 is higher than or equal to the lower limit Vtl1 of the first reference voltage range (step S105: No), the processing of step S101 is performed again. On the other hand, when determining that the voltage value V1 of the input voltage of the power conversion circuit 32 is less than the lower limit Vtl1 of the first reference voltage range (step S105: Yes), the input voltage determination unit 415 updates the output voltage instruction value represented by the output voltage instruction information, which is to be output to the converter control unit 412, to an output voltage instruction value that is greater than the output voltage instruction value by the above-described unit voltage. Accordingly, the converter control unit 412 controls the ON/OFF operations of the switching elements Q21, Q22, Q23, and Q24 in the power conversion circuit 12 to increase the output voltage of the power conversion circuit 12 by the unit voltage (step S106). Subsequently, the processing of step S101 is performed again.

Figure 4:
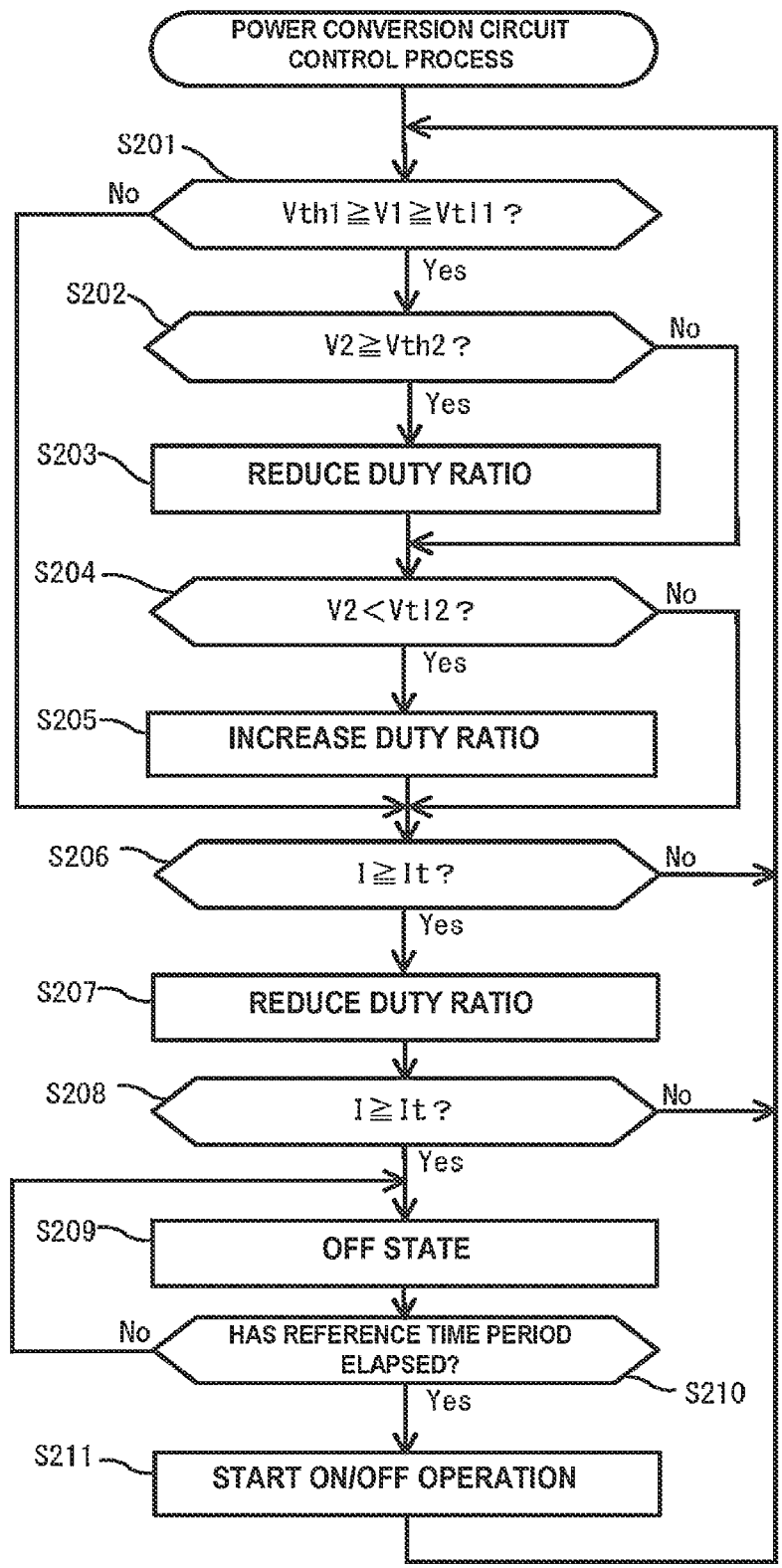
FIG. 4 is a flowchart illustrating an exemplary process of controlling a power conversion circuit which is performed by a controller according to an embodiment.

Next, a power conversion circuit control process performed by the controller 41 according to the present embodiment will be described with reference to FIG. 4. This power conversion circuit control process is performed in parallel with a PFC circuit output voltage adjustment process. First, the output voltage determination unit 416 determines whether the voltage value V1 of the input voltage of the power conversion circuit 32 falls within the above-described first reference voltage range on the basis of the notification signal notifying that the input voltage of the power conversion circuit 32 falls within the first reference voltage range input from the input voltage determination unit 415 (step S201). When the output voltage determination unit 416 determines that the voltage value V1 of the input voltage of the power conversion circuit 32 does not fall within the first reference voltage range (step S201: No), the processing of step S206 to be described below is performed. On the other hand, when determining that the voltage value V1 of the input voltage of the power conversion circuit 32 falls within the first reference voltage range (step S201: Yes), the output voltage determination unit 416 determines whether a voltage value V2 of the output voltage of the power conversion circuit 32 is greater than an upper limit Vth2 of the second reference voltage range set in advance (step S202). When the output voltage determination unit 416 determines that the voltage value V2 of the output voltage of the power conversion circuit 32 is less than the upper limit Vth2 of the second reference voltage range (step S202: No), the processing of step S204 to be described blow will be performed. On the other hand, when determining that the voltage value V2 of the output voltage of the power conversion circuit 32 is greater than or equal to the upper limit Vth2 of the second reference voltage range (step S202: Yes), the output voltage determination unit 416 updates the output voltage instruction value represented by the output voltage instruction information, which is to be output to the converter control unit 414, to an output voltage instruction value that is lower than the output voltage instruction value by the above-described unit voltage. Accordingly, the converter control unit 414 reduces the duty ratio of the ON/OFF operation of the switching element Q4 in the power conversion circuit 32 to reduce the output voltage of the power conversion circuit 32 by the unit voltage (step S203).

Subsequently, the output voltage determination unit 416 determines whether the voltage value V2 of the output voltage of the power conversion circuit 32 is less than a lower limit Vt12 of the second reference voltage range (step S204). When the output voltage determination unit 416 determines that the voltage value V2 of the output voltage of the power conversion circuit 32 is greater than or equal to the lower limit Vt12 of the second reference voltage range (step S204: No), the processing of step S206 to be described below is performed. On the other hand, when determining that the voltage value V2 of the output voltage of the power conversion circuit 32 is less than the lower limit Vt12 of the second reference voltage range (step S204: Yes), the output voltage determination unit 416 updates the output voltage instruction value represented by the output voltage instruction information, which is to be output to the converter control unit 414, to an output voltage instruction value that is higher than the output voltage instruction value by the above-described unit voltage. Accordingly, the converter control unit 414 increases the duty ratio of the ON/OFF operation of the switching element Q4 in the power conversion circuit 32 to increase the output voltage of the power conversion circuit 32 by the unit voltage (step S205).

Subsequently, the current determination unit 417 determines whether a current value I of the current flowing through the switching element Q4 in the power conversion circuit 32 when the switching element Q4 is in the ON state is greater than or equal to a current threshold value It (step S206). When the current determination unit 417 determines that the current value I of the current flowing through the switching element Q4 is less than the current threshold value It (step S206: No), the processing of step S201 is performed again. On the other hand, when determining that the current value I of the current flowing through the switching element Q4 is greater than or equal to the current threshold value It (step S206: Yes), the current determination unit 417 outputs to the converter control unit 414 the duty ratio reduction instruction signal for instructing that the duty ratio of the ON/OFF operation of the switching element Q4 is reduced by a rate set in advance. The converter control unit 414 reduces the duty ratio of the ON/OFF operation of the switching element Q4 in the power conversion circuit 32 (step S207).

Subsequently, the current determination unit 417 determines again whether the current value I of the current flowing through the switching element Q4 in the power conversion circuit 32 when the switching element Q4 is in the ON state is greater than or equal to the current threshold value It (step S208). When the current determination unit 417 determines that the current value I of the current flowing through the switching element Q4 is less than the current threshold value It (step S208: No), the processing of step S201 is performed again. On the other hand, when determining that the current value I of the current flowing through the switching element Q4 when the switching element Q4 is in the ON state is greater than or equal to the current threshold value It (step S208: Yes), the current determination unit 417 outputs to the converter control unit 414 an OFF instruction signal for instructing that the switching element Q4 is maintained in the OFF state. When the OFF instruction signal is input to the converter control unit 414, the converter control unit 414 brings the switching element Q4 into the OFF state (step S209). Subsequently, the converter control unit 414 determines whether a reference time period set in advance has elapsed immediately after the input of the OFF instruction signal (step S210). When the converter control unit 414 determines that the reference time period has not elapsed immediately after the input of the off instruction (step S210: No), the processing of step S209 is performed again. On the other hand, when determining that the reference time period has elapsed immediately after the input of the off instruction (step S210: Yes), the converter control unit 414 restarts the ON/OFF operation of the switching element Q4 (step S211). Subsequently, the processing of step S201 is performed again.

As described above, in a power supply circuit according to the present embodiment, the power conversion circuit 32 boosts a direct current output from the rectifying and smoothing circuit 31 and outputs a DC voltage lower than the rated voltage of the load LO2 to the load LO2. Since a voltage lower than the rated voltage of the load LO2 can be output to the load LO2 when the power conversion circuit 32 fails and loses the boosting function thereof, the breakage of the load LO2 due to the application of a voltage exceeding the rated voltage of the load LO2 to the load LO2 can be suppressed.

The converter control unit 412411 according to the present embodiment controls the ON/OFF operations of the switching elements Q21, Q22, Q23, and Q24 in the power conversion circuit 12 to reduce the output voltage of the power conversion circuit 12 when the input voltage determination unit 415 determines that the input voltage of the power conversion circuit 32 is greater than or equal to the upper limit of the first reference voltage range. When the input voltage determination unit 415 determines that the input voltage of the power conversion circuit 32 is greater than or equal to the upper limit of the first reference voltage range after the output voltage of the power conversion circuit 12 has been reduced, the converter control unit 412411 stops the power conversion circuit 12. That is, when the input voltage of the power conversion circuit 32 does not fall within the first reference voltage range even after the ON/OFF operations of the switching elements Q21, Q22, Q23, and Q24 in the power conversion circuit 12 have been controlled for the reduction in the output voltage of the power conversion circuit 12, it is determined that abnormal conditions have occurred and a device is stopped. This leads to the protection of the load LO2.

The converter control unit 414 according to the present embodiment maintains the switching element Q4 in the OFF state when the current determination unit 417 determines that the current value of the current flowing through the switching element Q4 in the ON state is greater than or equal to the current threshold value set in advance. Since the flow of an overcurrent through the switching element Q4 is suppressed, the breakage of the switching element Q4 can be suppressed.

The converter control unit 414 according to the present embodiment restarts the ON/OFF operation of the switching element Q4 when the current determination unit 417 determines that the current value of the current flowing through the switching element Q4 in the ON state is less than the current threshold value after the elapse of a reference time period set in advance from a time at which the switching element Q4 has been brought into the OFF state. As a result, since the power conversion circuit 32 can be quickly restored to an original operational state in the case where the switching element Q4 is brought into the OFF state because of the sudden abnormality of the power conversion circuit 32, the MTTR of the power supply circuit can be reduced.

Although an embodiment of the present disclosure has been described, the present disclosure is not limited to the configuration according to the above-described embodiment. For example, a converter control unit for controlling the power conversion circuit 12 may control the power conversion circuit 12 to reduce the output voltage of the power conversion circuit 12 or stop the power conversion circuit 32 when it is determined that the input voltage of the power conversion circuit 32 is equal to or greater than the upper limit of the first reference voltage range. The input voltage determination unit 415 according to a present modification determines whether the input voltage of the power conversion circuit 32 falls within the above-described first reference voltage range. When determining that the input voltage of the power conversion circuit 32 is greater than or equal to the upper limit of the first reference voltage range, the input voltage determination unit 415 outputs an OFF instruction signal for instructing that the power conversion circuit 12 is stopped to the converter control unit 412. When the OFF instruction signal is input to the converter control unit 412, the converter control unit 412 maintains all of the switching elements Q21, Q22, Q23, and Q24 in the power conversion circuit 12 in the OFF state for a reference time period set in advance.

Figure 5:
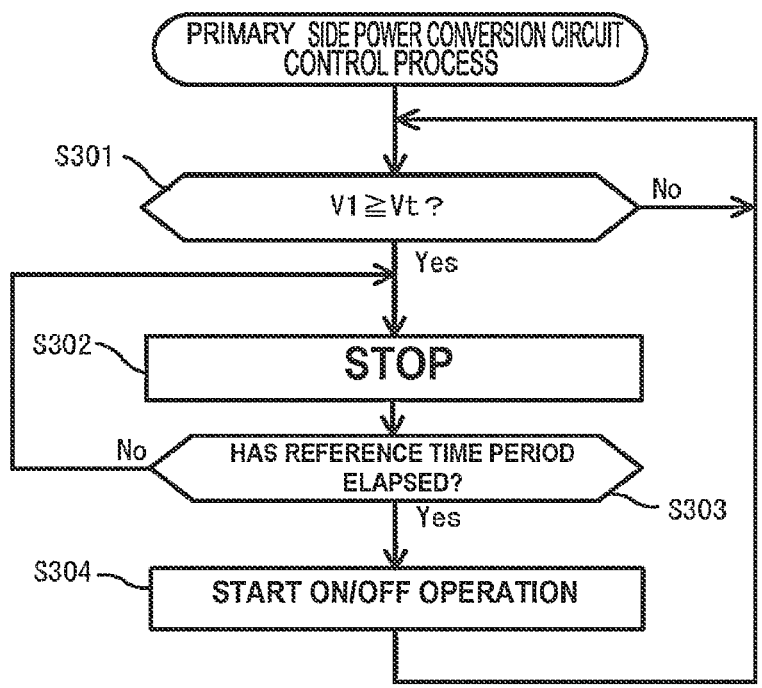
FIG. 5 is a flowchart illustrating an exemplary process of controlling a primary-side power conversion circuit which is performed by a controller that is a modification.

A primary-side power conversion circuit control process of controlling the power conversion circuit 12 on the primary side of the transformer Tr1, which is performed by a controller according to the present modification, will be described with reference to FIG. 5. This power conversion circuit control process is performed in parallel with the power conversion circuit control process described in the embodiment. First, the input voltage determination unit 415 determines whether the voltage value V1 of the input voltage of the power conversion circuit 32 is greater than or equal to an upper limit Vt of the first reference voltage range set in advance (step S301). When determining that the voltage value V1 of the input voltage of the power conversion circuit 32 is less than the upper limit Vt of the first reference voltage range (step S301: No), the input voltage determination unit 415 repeatedly performs the processing of step S301. On the other hand, when determining that the voltage value V1 of the input voltage of the power conversion circuit 32 is greater than or equal to the upper limit Vt of the first reference voltage range (step S301: Yes), the input voltage determination unit 415 outputs an OFF instruction signal to the converter control unit 412. The converter control unit 412 stops the power conversion circuit 12 by maintaining all of the switching elements Q21, Q22, Q23, and Q24 in the power conversion circuit 12 in the OFF state for a reference time period set in advance (step S302).

Subsequently, the converter control unit 412 determined whether the reference time period has elapsed immediately after the input of the OFF instruction signal (step S303). When determining that the reference time period has not elapsed immediately after the input of the OFF instruction signal (step S303: No), the converter control unit 412 performs the processing of step S302 again. On the other hand, when determining that the reference time period has elapsed immediately after the input of the OFF instruction signal (step S303: Yes), the converter control unit 412 restarts the ON/OFF operations of the switching elements Q21, Q22, Q23, and Q24 (step S304). Subsequently, the processing of step S301 is performed again.

Since the power conversion circuit 12 is stopped when the input voltage of the power conversion circuit 32 is greater than or equal to the upper limit of the first reference voltage range with this configuration, the application of an excessively high voltage to the power conversion circuit 32 can be prevented.

The exemplary case has been described in the embodiment where the converter control unit 414 dynamically changes the duty ratio of the ON/OFF operation of the switching element Q4 to bring the output voltage of the power conversion circuit 32 into the second reference voltage range. However, the converter control unit 414 may stop the power conversion circuit 32 when the output voltage of the power conversion circuit 32 is greater than or equal to the upper limit of the second reference voltage range.

Figure 6:
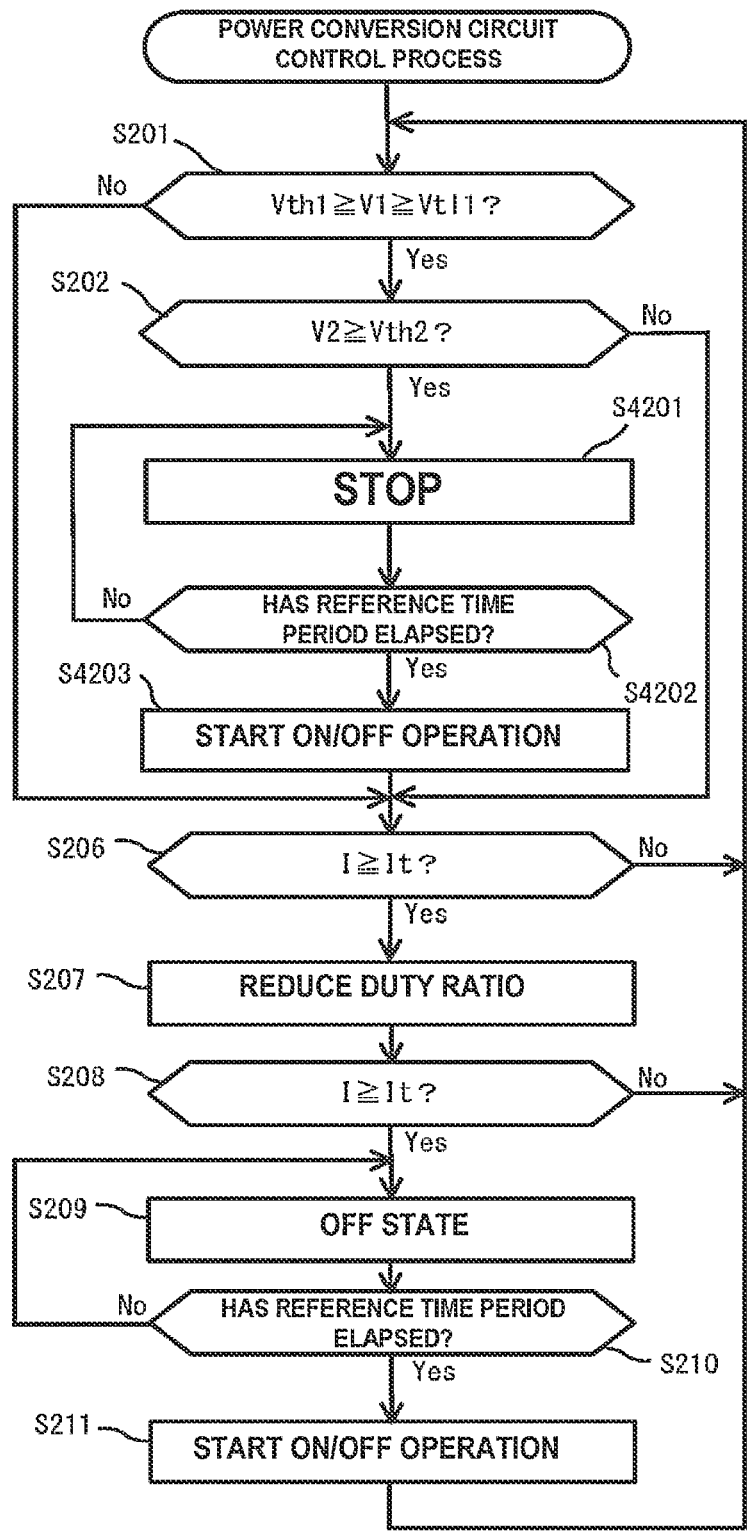
FIG. 6 is a flowchart illustrating an exemplary process of controlling a power conversion circuit which is performed by a controller that is a modification.

A power conversion circuit control process performed by the controller 41 according to the present modification will be described with reference to FIG. 6. The same processing as the processing in the power conversion circuit control process according to the embodiment described with reference to FIG. 6 is denoted by the same reference numeral. First, the processing of steps S201 and S202 is performed. When the output voltage determination unit 416 determines that the voltage value V2 of the output voltage of the power conversion circuit 32 is less than the upper limit Vth2 of the second reference voltage range in step S202 (step S202: No), the processing of step S206 to be described below is performed. On the other hand, when determining that the voltage value V2 of the output voltage of the power conversion circuit 32 is greater than or equal to the upper limit Vth2 of the second reference voltage range in step S202 (step S202: Yes), the output voltage determination unit 416 outputs an OFF instruction signal for stopping the power conversion circuit 32 to the converter control unit 414. The converter control unit 414 stops the power conversion circuit 32 by bringing the switching element Q4 into the OFF state (step S4201).

Subsequently, the converter control unit 414 determines whether a reference time period set in advance has elapsed immediately after the input of an OFF instruction signal (step S4202). When determining that the reference time period has not elapsed immediately after the input of the OFF instruction signal (step S4202: No), the converter control unit 414 performs the processing of step S4201 again. On the other hand, when determining that the reference time period has elapsed immediately after the input of the OFF instruction signal (step S4202: Yes), the converter control unit 414 restarts the ON/OFF operation of the switching element Q4 (step S4203). Subsequently, the process from step S206 is performed.

Since the power conversion circuit 32 is stopped when the output voltage of the power conversion circuit 32 is greater than or equal to the upper limit of the second reference voltage range with this configuration, the breakage of the load LO2 due to the application of a high voltage to the load LO2 can be suppressed.

Figure 7:
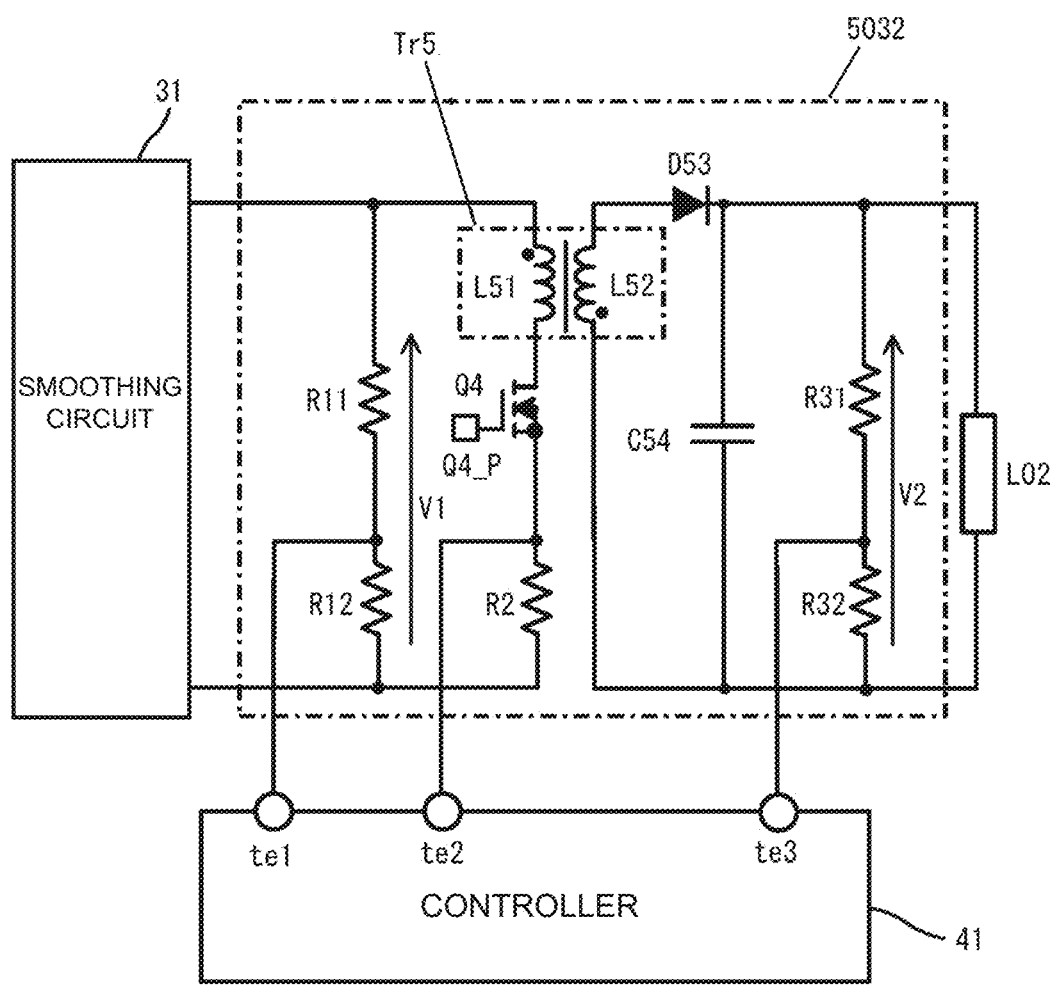
FIG. 7 is a circuit diagram of a power conversion circuit that is a modification.

The case has been described in the embodiment where the power conversion circuit 32 connected to the rectifying and smoothing circuit 31 on the secondary side of the transformer Tr1 is a non-isolated step-up DC-DC converter. However, a power conversion circuit 5032 including a flyback converter that is an insulating DC-DC converter illustrated in, for example, FIG. 7 may be connected to the rectifying and smoothing circuit 31. Referring to FIG. 7, the same reference numerals are used to identify components already described in the embodiment with reference to FIG. 1. The power conversion circuit 5032 includes a transformer Tr5 having a primary winding L51 and a secondary winding L52, the switching element Q4, a diode D53, and a capacitor C54. One end of the primary winding L51 of the transformer Tr5 is connected to the high-potential-side output terminal of the rectifying and smoothing circuit 31. The switching element Q4 is connected between the other end of the primary winding L51 of the transformer Tr5 and the low-potential-side output terminal of the rectifying and smoothing circuit 31. The diode D53 has an anode connected to one end of the secondary winding L52 of the transformer Tr5 and a cathode connected to the load LO2. The other end of the secondary winding L52 is connected to the load LO2. One end of the capacitor C54 is connected to the cathode of the diode D53, and the other end of the capacitor C54 is connected to the other end of the secondary winding L52. A series circuit of the two resistors R31 and R32 is connected in parallel to the capacitor C54.

In the embodiment, the diode D3 in the power conversion circuit 32 may be a switching element.

In the present disclosure, it should be noted that various embodiments and modifications can be made without necessarily departing from the broad spirit and scope of the present disclosure. The above-described embodiment is provided to illustrate the present disclosure and is not intended to limit the scope of the present disclosure. More specifically, the scope of the present disclosure is not specified by the embodiment but by the claims. Furthermore, various modifications made within the scope of the claims and within the scope of the inventive sense equivalent to the claims are considered within the scope of the present disclosure.

This application is based on Japanese Patent Application No. 2020-115408 filed on Jul. 3, 2020. The specification, claims, and drawings of Japanese Patent Application No. 2020-115408 are incorporated herein by reference in their entirety.

INDUSTRIAL APPLICABILITY

The present disclosure is suitable for use as a power supply having both a low-voltage power supply function and a high-voltage power supply function which is installed in a vehicle.

REFERENCE SIGNS LIST

11: PFC circuit, 12, 21, 32, and 5032: power conversion circuit, 31: rectifying and smoothing circuit, 41: controller, 411, 412, 413, and 414: converter control unit, 415: input voltage determination unit, 416: output voltage determination unit, 417: current determination unit, CN: connector, C1, C2, C3, and C54: capacitor, D3, D11, D12, D13, D21, D22, and D53: diode, DB: diode bridge, G: AC system, L1 and L51: primary winding, L3, L11, L12, and L13: inductor, L21, L22, and L52: secondary winding, L221 and L222: sub-winding, LO1 and LO2: load, Q4, Q11, Q12, Q13, Q21, Q22, Q23, Q24, Q31, Q32, Q33, and Q34: switching element, Q4_P, Q11_P, Q12_P, Q13_P, Q21_P, Q22_P, Q23_P, Q24_P, Q31_P, Q32_P, Q33_P, Q34_P, te1, te2, te3, and teG: terminal, R2, R11, R12, R31, and R32: resistor, Tr1 and Tr5: transformer

The invention claimed is:

1. A power supply circuit comprising:
   a transformer comprising a primary winding and a secondary winding;
   a first power conversion circuit configured to convert a DC voltage into an AC voltage and output the AC voltage to the primary winding;
   a rectifying and smoothing circuit configured to rectify and smooth an AC voltage output from the secondary winding;
   a second power conversion circuit configured to boost a DC voltage output from the rectifying and smoothing circuit and supply to, a first load, a DC voltage lower than a rated voltage of the first load set in advance; and
   a controller configured to:
      determine whether an input voltage of the second power conversion circuit falls within a first reference voltage range set in advance, and
      control the first power conversion circuit,
      wherein, when the controller is configured to determine that the input voltage of the second power conversion circuit is greater than or equal to an upper limit of the first reference voltage range, the controller is configured to control the first power conversion circuit so as to reduce an output voltage of the second power conversion circuit, and
      when the controller is configured to determine that the input voltage of the second power conversion circuit is greater than or equal to the upper limit of the first reference voltage range after the control of the first power conversion circuit, the controller is configured to stop the first power conversion circuit.

2. The power supply circuit according to claim 1, wherein the secondary winding comprises two secondary windings.

3. The power supply circuit according to claim 2, wherein at least one of the two secondary windings is provided on a side of the first load.

4. The power supply circuit according to claim 2, wherein at least one of the two secondary windings includes a pair of sub-windings.

5. The power supply circuit according to claim 1, wherein the controller is further configured to control the second power conversion circuit, and wherein, when the controller is configured to determine that the input voltage of the second power conversion circuit is greater than or equal to the upper limit of the first reference voltage range, the controller is configured to stop the second power conversion circuit.

6. The power supply circuit according to claim 1, wherein the controller is further configured to:
   determine whether an output voltage of the second power conversion circuit falls within a second reference voltage range set in advance, and
   control the second power conversion circuit,
   wherein the second power conversion circuit comprises a second inductor, a first end of which is connected to a high-potential-side output terminal of the rectifying and smoothing circuit, and a second switching element connected between a second end of the second inductor and a low-potential-side output terminal of the rectifying and smoothing circuit, and
   wherein, when the controller is configured to determine that the input voltage of the second power conversion circuit falls within the first reference voltage range set in advance and the controller is configured to determine that the output voltage of the second power conversion circuit is greater than or equal to an upper limit of the second reference voltage range, the controller is further configured to control an ON/OFF operation of the second switching element to reduce the output voltage of the second power conversion circuit.

7. The power supply circuit according to claim 6, wherein the controller is further configured to determine whether a current flowing through the second switching element is greater than or equal to a current threshold value set in advance, and wherein, when the controller is configured to determine that a current value of the current flowing through the second switching element is greater than or equal to the current threshold value, the controller is configured to maintain the second switching element in an OFF state.

8. The power supply circuit according to claim 7, wherein, when the controller is configured to determine that the current value of the current flowing through the second switching element in an ON state is less than the current threshold value after an elapse of a reference time period set in advance from a time at which the second switching element has been brought into the OFF state, the controller is configured to restart the ON/OFF operation of the second switching element.

9. The power supply circuit according to claim 6, wherein the controller is further configured to determine whether a current flowing through the second switching element is greater than or equal to a current threshold value set in advance, and wherein, when the controller is configured to determine that a current value of the current flowing through the second switching element is greater than or equal to the current threshold value, the controller is further configured to reduce a duty ratio of the second switching element.

10. The power supply circuit according to claim 1, further comprising a third power conversion circuit configured to convert an alternating current into a direct current and output the direct current from the secondary winding to a second load, the second load being different from the first load.

11. The power supply circuit according to claim 10, wherein the third power conversion circuit comprises a plurality of switching elements.

12. The power supply circuit according to claim 11, wherein at least one of the plurality of switching elements comprises a drain that is connected to a first end of the secondary winding.

13. The power supply circuit according to claim 1, further comprising a power factor correction circuit configured to improve a power factor of an alternating current that is supplied from a system.

14. The power supply circuit according to claim 13, wherein the power factor correction circuit comprises a plurality of inductors, a plurality of switching elements, and a plurality of diodes.

15. The power supply circuit according to claim 14, further comprising one or more smoothing capacitors.

16. The power supply circuit according to claim 15, wherein at least one of the one or more smoothing capacitors is connected between a first switching element and a second switching element.

17. The power supply circuit according to claim 1, further comprising a diode bridge configured to rectify an alternating current supplied from a system.

18. The power supply circuit according to claim 17, wherein the diode bridge comprises a high-potential-side output terminal and a low-potential-side output terminal.

19. The power supply circuit according to claim 18, further comprising a first smoothing capacitor, wherein a first end of the first smoothing capacitor is connected to the low-potential-side output terminal of the diode bridge.

20. The power supply circuit according to claim 1, wherein the rectifying and smoothing circuit comprises one or more diodes, and a smoothing capacitor, wherein a first end of the smoothing capacitor is connected to one of the one or more diodes, and a second end of the smoothing capacitor is connected to the secondary winding.

* * * * *

UNITED STATES PATENT AND TRADEMARK OFFICE
CERTIFICATE OF CORRECTION

| | | |
|---|---|---|
| PATENT NO. | : 12,224,671 B2 | Page 1 of 1 |
| APPLICATION NO. | : 18/069527 | |
| DATED | : February 11, 2025 | |
| INVENTOR(S) | : Kazuaki Mino | |

It is certified that error appears in the above-identified patent and that said Letters Patent is hereby corrected as shown below:

In the Specification

Column 5, Line 42, "Q31 and 033, respectively" should be --Q31 and Q33, respectively--

Signed and Sealed this
Twentieth Day of January, 2026

John A. Squires
*Director of the United States Patent and Trademark Office*